United States Patent [19]
Takeda

[11] 3,790,835
[45] Feb. 5, 1974

[54] DISC ARMATURE

[75] Inventor: Naozi Takeda, Osaka, Japan

[73] Assignee: Matsushita Electric Industrial Co., Ltd., Osaka, Japan

[22] Filed: Mar. 7, 1972

[21] Appl. No.: 232,481

[30] Foreign Application Priority Data

| | | |
|---|---|---|
| Mar. 10, 1971 | Japan | 46/13335 |
| June 18, 1971 | Japan | 46/44376 |
| June 23, 1971 | Japan | 46/45933 |
| June 30, 1971 | Japan | 46/48432 |
| Oct. 4, 1971 | Japan | 46/78072 |
| June 30, 1971 | Japan | 46/57492 |

[52] U.S. Cl. ................................ 310/268, 310/237
[51] Int. Cl. ...................... H02k 1/22, H02k 13/04
[58] Field of Search .... 310/268, 233, 234, 236, 237

[56] References Cited
UNITED STATES PATENTS

| | | | |
|---|---|---|---|
| 3,524,250 | 8/1970 | Burr | 310/268 X |
| 3,431,638 | 3/1969 | Burr | 310/268 X |
| 3,599,325 | 8/1971 | Burr et al. | 310/268 X |
| 3,153,165 | 10/1964 | Baudot | 310/268 |
| 3,315,106 | 4/1967 | Reynst | 310/268 |

Primary Examiner—Gerald Goldberg
Assistant Examiner—Mark O. Budd
Attorney, Agent, or Firm—Stevens, Davis, Miller & Mosher

[57] ABSTRACT

A disc armature having a plurality of armature coils assembled in the form of a disc, each coil comprising at least one turn of conductor covered with insulating sheath, the thickness of the effective portion of the armature winding or the coil side portion which lies within the field air-gap being equal to that of one individual armature coil and the coil end portions of the armature winding being thickner than the coil side portion since the coil ends of one individual armature coil overlap those of another, and the thicker coil end portions being accommodated in a space defined by the field magnet and the frame so that a very high space factor can be attained.

3 Claims, 15 Drawing Figures

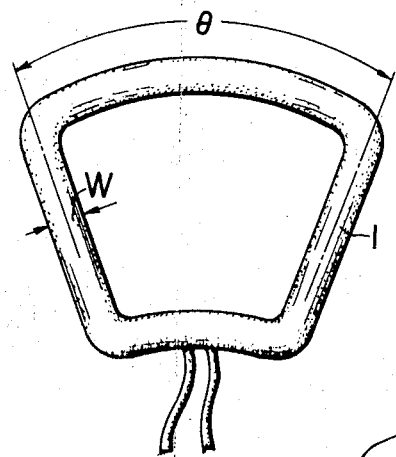
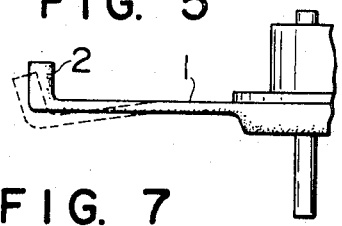
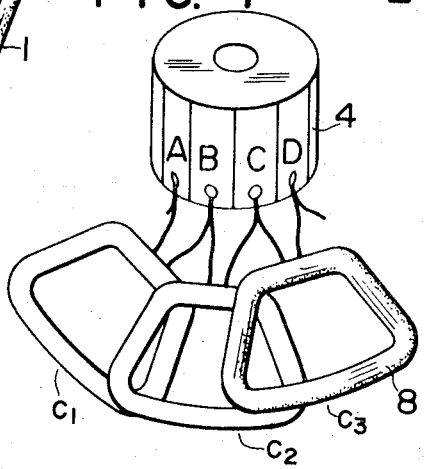
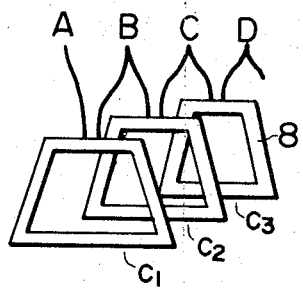
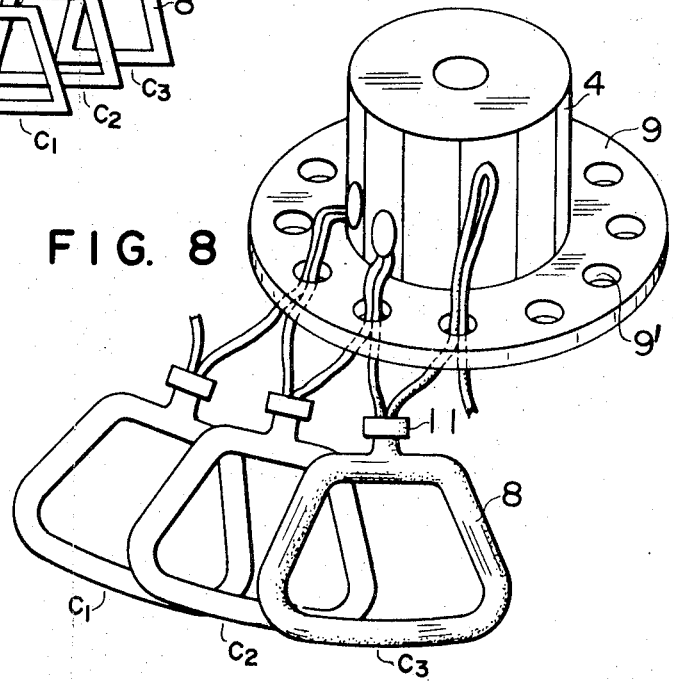

PATENTED FEB 5 1974 3,790,835

DISC ARMATURE

The present invention relates to a disc-shaped non-iron-core armature formed by winding an insulated conductor.

One object of the present invention is to provide an armature wherein the space, which occupied by, which the coil ends of the armature winding, which do contribute not to the generation of torque is reduced as much as possible so as to achieve a high space factor.

Another object of the invention is to provide an armature which has the effective portions of its winding made very thin and which has a high dielectric strength.

Here, the effective portions of the armature winding are those portions which lie under-neath the field poles spaced by the air gap to create torque, i.e. coil sides of the coils constituting the armature winding. If the thickness of each effective portion of the armature coils is reduced, the air gap is reduced, so that field flux is more effectively utilized to produce a stronger torque. Further, this also adds to the space factor and dielectric strength, thereby allowing a machine using such an armature to be operated at higher voltages.

A further object of the invention is to provide a structure of such an armature having excellent features as described above which is easy to manufacture.

For a better understanding of this invention reference should be had to the accompanying drawings which shows embodiments of the invention, in which the same reference numerals and characters are applied to like parts throughout the drawings and in which:

FIG. 4 shows one of the coils constituting the armature winding according to the invention;

FIG. 5 is a fragmentary view of an armature as another embodiment of the invention;

FIGS. 6 and 7 are views for explaining the fabrication of an armature according to the invention;

FIG. 8 is a perspective exploded view of an armature as a further embodiment of the invention;

Figure 1:
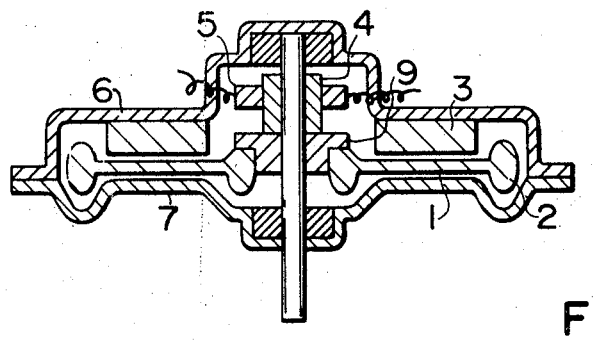
FIG. 1 is a cross sectional view of an electric motor accommodating an armature according to the present invention.

In FIG. 1, numeral 1 designates the effective portions of the coils constituting the armature winding which portions rotate in the stator field; 2 the outer coil end of the armature winding; 3 a field magnet or stator; 4 a commutator; 5 brushes; 6 a frame of the motor; 7 a cover of the frame; and 9 an intermediate connection disc which will later be described in detail.

Figure 2:
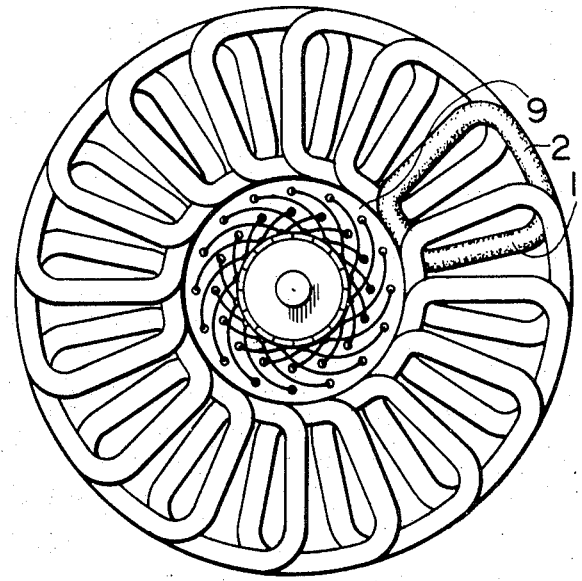
FIG. 2 is a top plan view of an armature as one embodiment of the invention.

In FIG. 2 which shows a structure of an armature winding consisting of a plurality of coils, each of which comprises a plurality of turns of insulated conductor, arranged in the form of a disc, the effective portions of the coils or coil sides to be located under-neath the stator poles are so arranged as not to overlap one another while the inner and outer coil ends are laid so that they may overlap one another. With this structure the space of circumferential distribution of the inner and outer coil ends is saved so that the resultant disc-shaped armature winding is much thicker in its portions corresponding to the inner and outer coil ends than in its portion which the coil sides occupy. The thicker coil ends are accommodated in spaced defined by the side walls of the stator magnet 3, the frame 6 and the depressions made in the cover 7, as seen in FIG. 1. The depressions in the cover 7 also serve to prevent the bending of the cover liable to be caused during the performance of the machine. In this way the ratio of the effective length of the coil side to the diameter of the armature is increased with the result that the space factor of the motor is improved. Further, the extension of the coil end portions along the radial direction of the disc-shaped armature winding is so small that the rotating inertia of the armature as rotor is small and the controllability is also improved. As described above, the effective portion of the armature winding must be made thinner since the gap through which the armature rotates is narrow.

According to the invention, in order to satisfy the above requirement, the coil pitch of the armature winding is carefully chosen so that the coil sides of the coils constituting the armature winding may not overlap one another, and after a plurality of coils have been arranged as illustrated in FIG. 2 the effective portion of the armature winding is flat-pressed by means of any suitable tool to restrict the thickness of that portion within a predetermined value and then the thus shaped armature winding is cast with resin to make a solid unit.

FIG. 4 shows one of the coils constituting the armature winding, the coil pitch being $\theta$ radian. In order to reduce the non-uniformity of torque and to obtain a smooth rotation, it is preferable to distribute the armature conductors uniformly, that is in equal angular space over a cast resin disc. Further, in order to increase the interlinkage of flux, it is preferable for the individual coils all span as near a full pole pitch as possible. The width of the coil W is so chosen that the adjacent coil sides may not overlap one another at their portion nearest the inner coil ends.

The separation of one coil side from another advantageously assures a high withstand voltage. On the other hand, if coil sides overlap one another or even if only two coil sides overlap each other, as is not the case with the present invention, then the conductors of two different coil sides overlapping each other are pressed very close to each other due to the flat-pressing process for the restriction of the thickness of the effective portion of the armature winding so that the withstand voltage is sometimes lowered due to the accidental impairment of the insulating sheath of the coil conductor. In order to prevent such a degradation in the insulating characteristic, an insulating film has to be inserted between the overlapping coil sides. However, the insertion of the insulating film will add to the complexity of assembling the armature coils and also to the thickness of the effective portion of the resultant armature winding, and it is not recommendable.

According to the present invention such difficulties as mentioned above can be completely eliminated and the process of manufacturing the armature winding is simple. Although the different coil ends overlap one another to form thicker portions, these portions do not lie underneath the field poles so that their thicknesses need not be restricted and therefore no pressure is applied to the portions. Only the effective portion of the armature winding is subjected to the flat-pressing treatment. Therefore, the withstand voltage between overlapping coil ends is not lowered since the conductors of different coil ends overlapping each other are not compressed.

Usually, with increasing rated voltage of the machine the turns of the individual coils of the armature winding would be increased. When subjected to the flat-pressing treatment, the conductors of each coil are compressed which constitute the coil sides of the individual coil. In this case, however, the potential difference between different conductors is small since they belong to the same coil. Thus, there is no danger of dielectric breakdown between the conductors of each individual coil.

Figure 3:
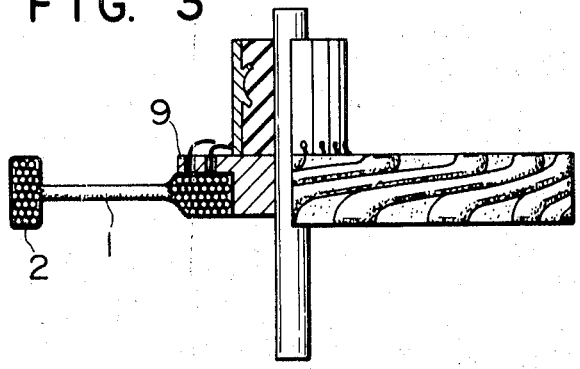
FIG. 3 is a partially sectional front view of the embodiment shown in FIG. 2.

In sum, the armature according to the invention is characterized in that the thickness of the effective portion of the winding is equal to that of each of the individual coils constituting the winding and that the coil end portions of the winding are thicker than the effective portion. The geometry of the outer coil end of an armature winding for use in a low-speed rotating machine may be as represented by solid line in FIG. 5. However, in case of the armature used in a high-speed machine the outer coil end portion should have such a shape as illustrated in FIGS. 1 and 3, i.e. symmetric structure. For the armature shown in FIG. 5, when rotated at a high speed, will be distorted as illustrated by the dotted line in FIG. 5 due to centrifugal force exerted on the outer coil end moving rapidly.

Now, the connections between the armature coils and the commutator segments will be described. In case of a lap winding a multiplex former is used to form a plurality of armature coils $C_1$, $C_2$, $C_3$ . . . etc. connected in series, as seen in FIG. 6, and the terminals A, B, C, . . . etc. which are the junctions of the individual coils 8, are connected respectively with the successive segments of the commutator 4 to complete an armature winding, as seen in FIG. 7. In case of a wave winding, on the other hand, those terminals A, B, C, . . . etc. are coupled to predetermined segments chosen according to the design of the armature winding.

If the terminals are directly connected with the segments of the commutator 4, as shown in FIG. 7, they are entangled so that erroneous connections of the terminals to the segment are apt to be caused and therefore this method of fabricating an armature winding is not so recommendable.

According to the present invention, an intermediate connection disc is inserted between the commutator and the armature coils to simplify the associated electrical wiring. The intermediate connection disc in its simplest form is a doughnut-shaped insulating plate having a plurality of small perforations therein.

Referring to FIG. 8 which illustrates a lap winding, binders 11 are used to prevent the individual coils from being decomposed due to any mechanical force. As illustrated, the intermediate connection disc 9 is an insulating discous plate having many perforations 9'. The terminals are first passed through these perforations 9' and then connected with the segments of the commutator 4. Since the terminals are passed through the respective perforations 9', they are to assume fixed locations with respect to the commutator 4. As a result, the wiring can be more easily done and the wrong connections can also be prevented. Thus, the intermediate connection disc 9 has an advantage that the terminals which are hard to be distinguished from one another can be definitely located. In case of wave winding the connections of the terminals to the commutator segments is more complex so that the intermediate connection disc 9 is the more preferably incorporated. The intermediate connection disc 9 shown in FIG. 2, which is adapted for wave winding, has small perforations 9' arranged in two concentric circles. In case of wave winding, separately formed armature coils, which are different from the series-connected armature coils adapted especially for lap winding as shown in FIG. 6, are preferably assembled. Both ends of each individual coil are passed through one of the perforations in the outer circle and the corresponding one of the perforations in the inner circle and the end through the inner perforation is connected with an appropriate segment of the commutator 4 after it is displaced circumferentially around the commutator 4. The circumferential displacement of the end of the particular coil is carried out by the conventional artifice, which is not herein described.

As described above, the armature having the intermediate connection disc according to the invention is easy of construction and takes a neat appearance. The perforations of the intermediate connection disc may not necessarily be circular but may be rectangle or of other shape, e.g. slits provided along the inner and outer perimeters of the doughnut insulating plate as intermediate connection disc 9.

Figure 9:
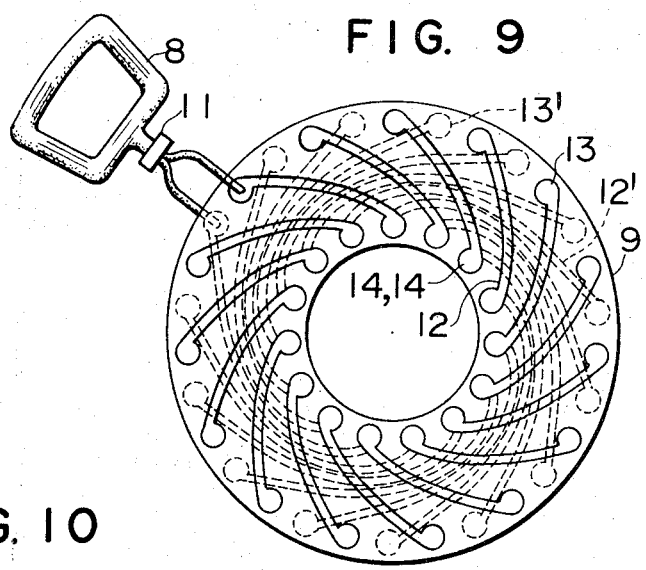
FIG. 9 shows an intermediate connection disc used in the armature according to the invention.
Figure 10:
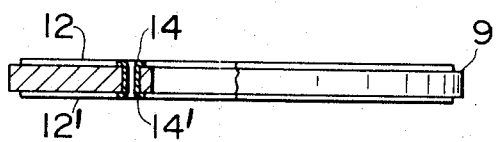
FIG. 10 is a partially sectional front view of the intermediate connection disc shown in FIG. 9.

FIG. 9 shows an exemplary structure of another embodiment of the intermediate connection disc 9. As seen in FIG. 9, conductors 12 and 12' are provided on both side of a doughnut-like insulating plate. The simplest provision of such conductors on the insulating plate is by means of printed circuit technique including punch-through operation. The outer terminals 13 and 13' of the conductors 12 and 12' are connected with both the ends of an individual armature coil 8, as illustrated. The inner terminals 14 and 14' of the conductors 12 and 12' are connected with each other through the insulating plate, as shown in FIG. 10, and they are in turn connected with the corresponding commutator segment.

Figure 11:
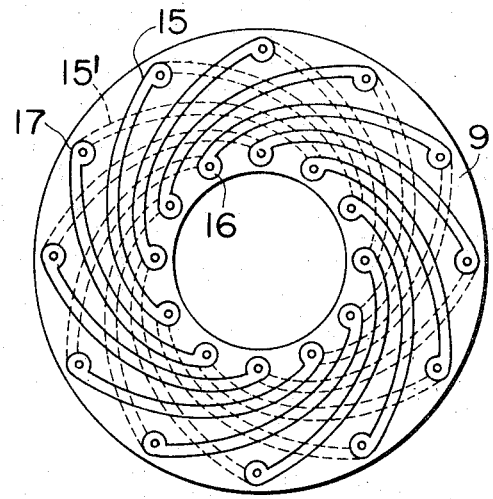
FIG. 11 shows another intermediate connection disc used in the armature according to the invention.

FIG. 11 shows the structure of another intermediate connection disc for use in a lap winding armature. As well known, an equalizer is necessary for a multipole lap-wound armature. This intermediate connection disc not only bridges the armature coils and the commutator segments but also serve as an equalizer.

Figure 12:
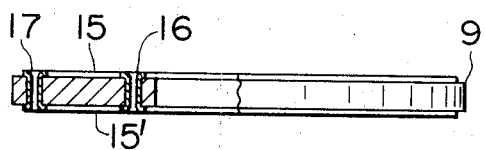
FIG. 12 is a partially sectional front view of the intermediate connection disc shown in FIG. 11.
Figure 13:
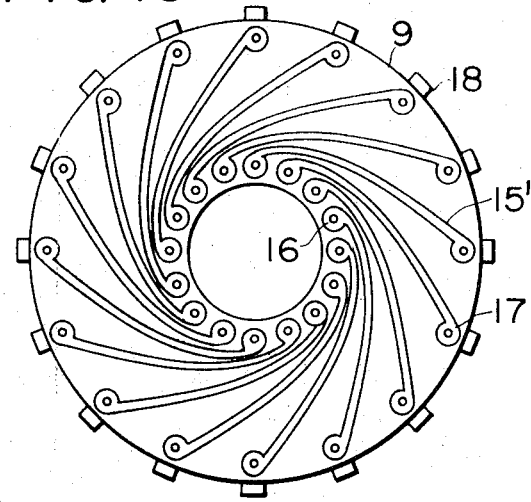
FIG. 13 is a top plan view of a disc-shaped commutator as one embodiment of the invention.
Figure 14:
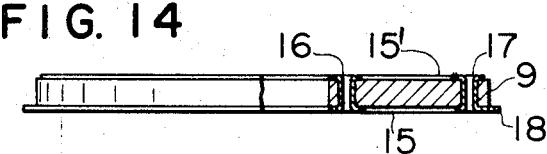
FIG. 14 is a partially sectional front view of the disc-shaped commutator shown in FIG. 13.
Figure 15:
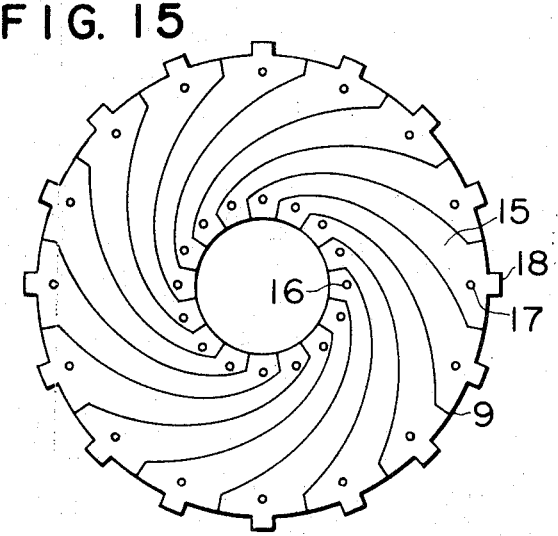
FIG. 15 is a bottom view of the commutator shown in FIG. 13.

The disc 9 shown in FIG. 11 is adapted for use in a four-pole lap-wound armature having 12 commutator segments. As illustrated in FIG. 11, conductors 15 and 15' are provided on both sides of a doughnut-like insulating plate. As mentioned previously, these conductors can be prepared through printed circuit technique, and it is needless to say that some other suitable methods can also be utilized. The outer terminals and the inner terminals of the conductors 15 are connected through the insulating plate respectively with the outer terminals and the inner terminals of the conductors 15'. FIG. 12 illustrates the feed-through connections of the outer terminals 17 and the inner terminals 16. In this way, each pair of the inner terminals 16 which are apart from each other by 360 electrical degrees are connected together through the corresponding pair of the outer terminal 17 which are also apart from each other by 360 electrical degrees. In FIG. 11, the intermediate connection disc 9 is adapted for a four-pole armature and the angle of 360 electrical degrees corresponds to the angle of 180° in space. If an intermediate connection disc is used whose conductors are thin sheets or strips of metal rigidly fixed to the insulating plate, the conductors can serve as the commutator segments. The exemplary structures of each polyfunctional connection discs are shown in FIGS. 13, 14 and 15. For example, in case of the connection disc 9 shown in FIG. 15, the conductors 15 may be used as commutator segments and therefore there is no need for a separate commutator. It should also be noted that the use of the disc shown in FIG. 15 can save the provision of separate equalizers. Thus, if such a polyfunctional connection disc is used in an armature, its structure will be much simplified. And this accounts for a great industrial merit. In these Figures, reference numeral 18 designates terminals for connecting the ends of coils.

What we claim is:

1. A disc armature comprising an armature winding, a commutator and a doughnut-shaped insulating plate, said armature winding consisting of a plurality of armature coils of the same geometry, each of which comprises at least one turn of conductor covered with insulating sheath, assembled in the form of a disc in such a manner that the coil sides of said armature coils may be uniformly distributed around the rotational shaft of said armature so as not to overlap one another and that the coil end portions of said armature winding consisting of plural coil ends of said armature coils overlapping one another may be thicker than the coil side portion of said armature winding, and said insulating plate having on both sides thereof a plurality of conductors extending from the inner perimeter to the outer one and comprising inner and outer terminals at both its ends, wherein the ends of said armature coils are connected with said outer terminals of said condcutors and the segments of said commutator are connected with said inner terminals of said conductor so that said conductors bridge said ends of said conductors and said commutator segments.

2. A disc armature comprising a lap-wound armature winding, a commutator and a doughnut-shaped insulating plate, said armature winding consisting of a plurality of armature coils of the same geometry, each of which comprises at least one turn of conductor covered with an insulating sheath, assembled in the form of a disc in such a manner that the coil sides of said armature coils may be uniformly distributed around the rotational shaft of said armature so as not to overlap one another and that the coil end portions of said armature winding consisting of plural coil ends of said armature coils overlapping one another may be thicker than the coil side portion of said armature winding, and said insulating plate having on both sides thereof a plurality of conductors extending from the inner perimeter to the outer one and comprising inner and outer terminals at both its ends, wherein the ends of said armature coils are connected with said outer terminals of said conductors and the segments of said commutator are connected with said inner terminals of said conductor and wherein any pair of conductors whose inner terminals are coupled to the commutator segments apart from each other by 360 electrical degrees are connected together through their outer terminals.

3. A disc armature comprising a lap-wound armature winding, a commutator and a doughnut-shaped insulating plate, said armature winding consisting of a plurality of armature coils of the same geometry, each of which comprises at least one turn of conductor covered with insulating sheath, assembled in the form of a disc in such a manner that the coil sides of said armature coils may be uniformly distributed around the rotational shaft of said armature so as not to overlap one another and that the coil end portions of said armature winding consisting of plural coil ends of said armature coils overlapping one another may be thicker than the coil side portion of said armature winding, and said insulating plate having on both sides thereof a plurality of conductors extending from the inner perimeter to the outer one and comprising inner and outer terminals at both its ends, wherein the ends of said armature coils are connected with said outer terminals of said conductors and the segments of said commutator are connected with said inner terminals of said conductor, whereby any pair of conductor whose inner terminals are coupled to the commutator segments apart from each other by 360 electrical degrees are connected together through their outer terminals and wherein said conductors on one side of said insulating plate are used as commutator segments and any pair of said conductors of said one side of said insulating plate apart from each other by 360 electrical degrees are short-circuited by means of said conductors on the other side of said insulating plate.

* * * * *